United States Patent [19]

Kuban

[11] Patent Number: 5,421,072

[45] Date of Patent: Jun. 6, 1995

[54] MACHINING CAROUSEL

[75] Inventor: William G. Kuban, Minneapolis, Minn.

[73] Assignee: Kurt Manufacturing Company, Inc., Minneapolis, Minn.

[21] Appl. No.: 142,773

[22] Filed: Oct. 26, 1993

[51] Int. Cl.6 .......................... B23B 1/00; B23B 7/14
[52] U.S. Cl. ................... 29/38 A; 29/38 B; 82/1.11; 82/129; 409/132
[58] Field of Search ................. 29/38 C, 563, 38 A, 29/38 B; 409/131, 132, 165; 82/1.11, 13, 129; 414/225

[56] References Cited

U.S. PATENT DOCUMENTS

| 1,732,700 | 10/1929 | Sommer et al. | 409/16 |
| 1,871,408 | 8/1932 | McDonough et al. | |
| 2,292,260 | 8/1942 | Adams et al. | 409/16 |
| 2,711,673 | 6/1955 | Miller | 409/12 |
| 2,842,985 | 7/1958 | Grover | 77/26 |
| 3,137,207 | 6/1964 | Berthiez | 90/11 |
| 3,168,851 | 2/1965 | Deflandre | 90/11 |
| 3,314,125 | 4/1967 | Walters | 29/38 |
| 3,336,823 | 8/1967 | Bonzi | 77/64 |
| 3,720,475 | 3/1973 | Leacock | 408/44 |
| 3,797,957 | 3/1974 | Hoglund | 408/44 |
| 4,200,182 | 4/1980 | Siarto | 198/617 |
| 4,237,796 | 12/1980 | Gordon et al. | 108/22 |
| 4,246,683 | 1/1981 | Siarto | 29/38 C |
| 4,422,265 | 12/1983 | Branston | 51/52 R |
| 4,520,595 | 6/1985 | Diener | 51/3 |
| 4,543,020 | 9/1985 | Shtipelman | 409/12 |
| 5,161,599 | 11/1992 | Bell | 164/194 |
| 5,261,148 | 11/1993 | Ettori | 29/38 B |

FOREIGN PATENT DOCUMENTS 0082149 7/1981 Japan .................. 483/13

Primary Examiner—Z. R. Bilinsky
Attorney, Agent, or Firm—Westman, Champlin & Kelly

[57] ABSTRACT

A device for machining a plurality of workpieces. The device having a plurality of identical independent machining assemblies attached on a rotating carousel plate such that one operator can unload and load a workpiece at one machining assembly while the other machining assemblies are machining the workpiece therein such that when a machining assembly returns from rotation on the carousel plate it is finished machining.

20 Claims, 8 Drawing Sheets

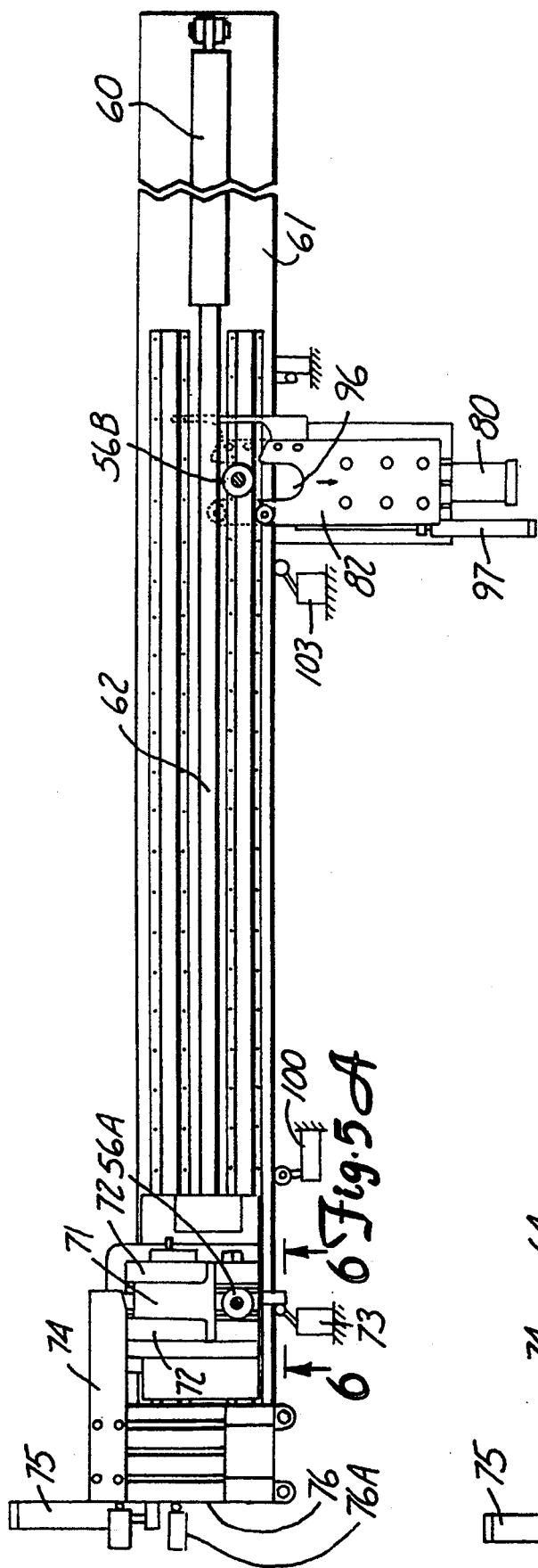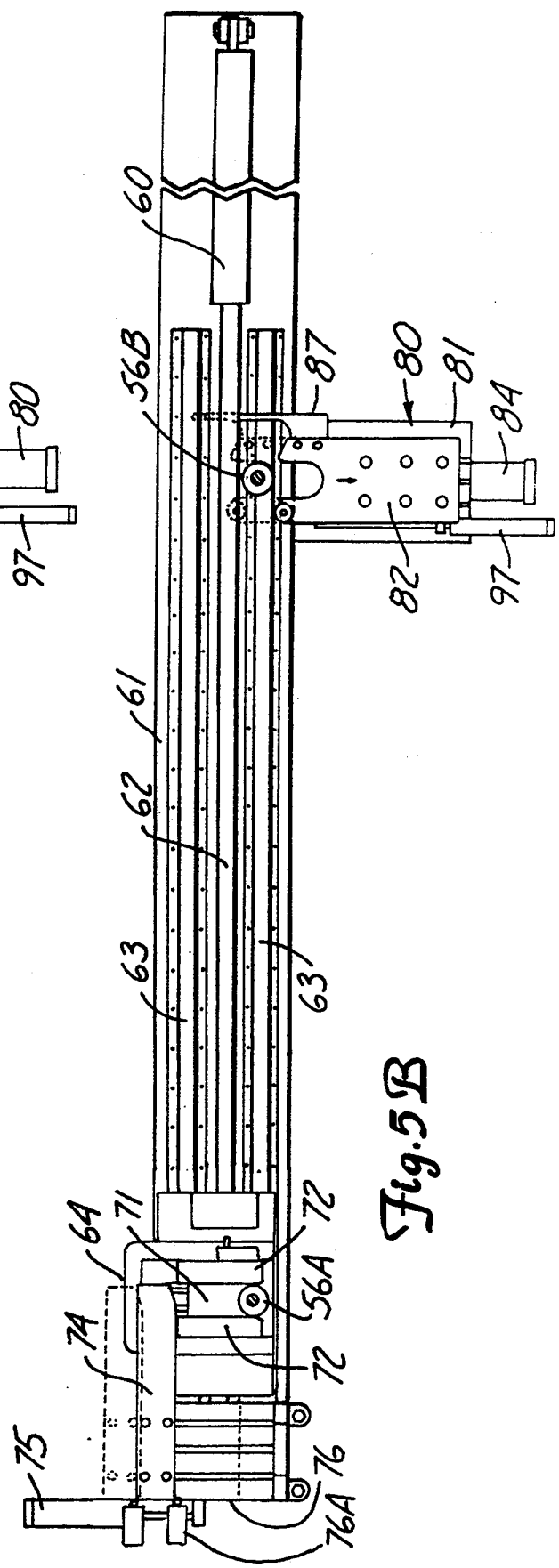

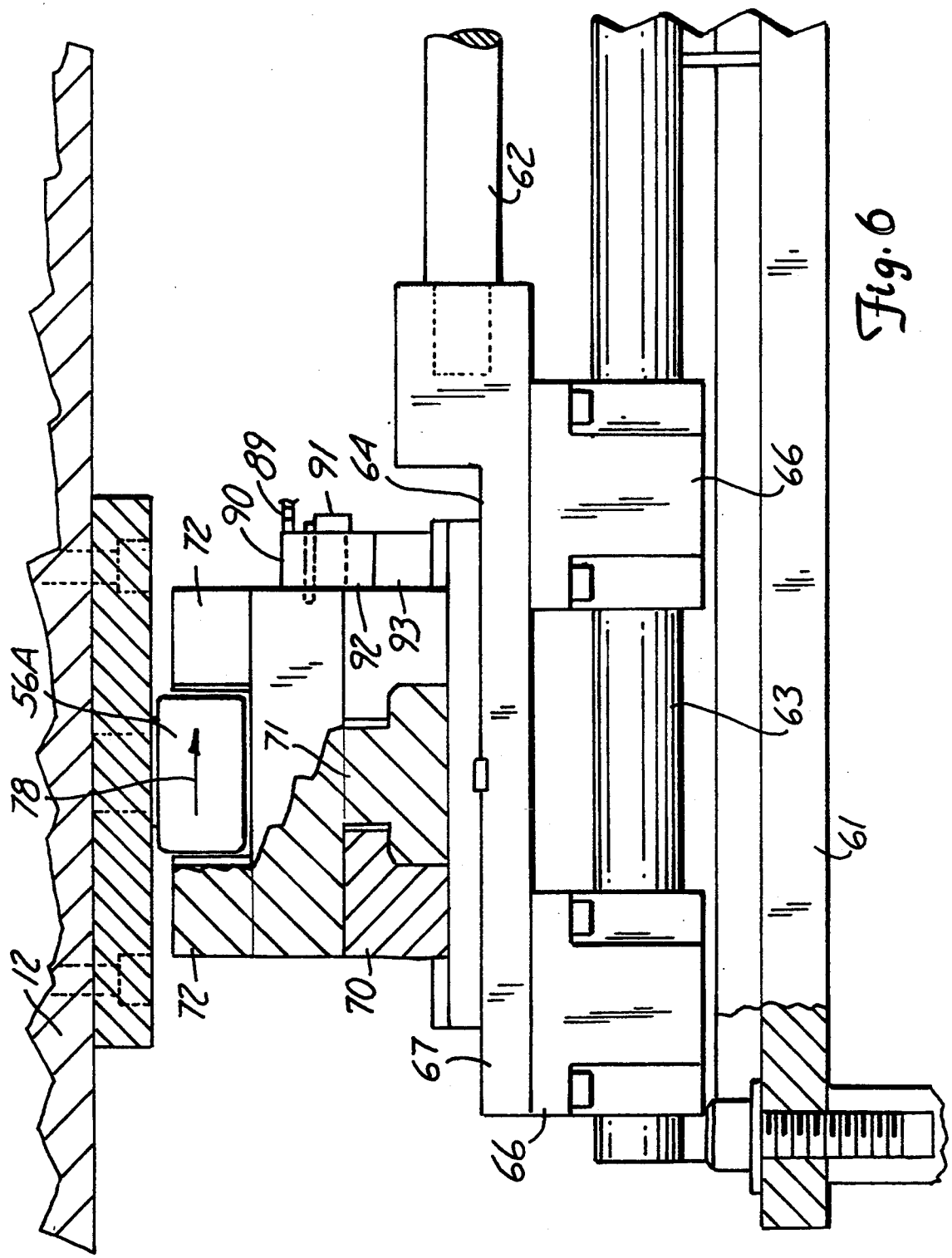

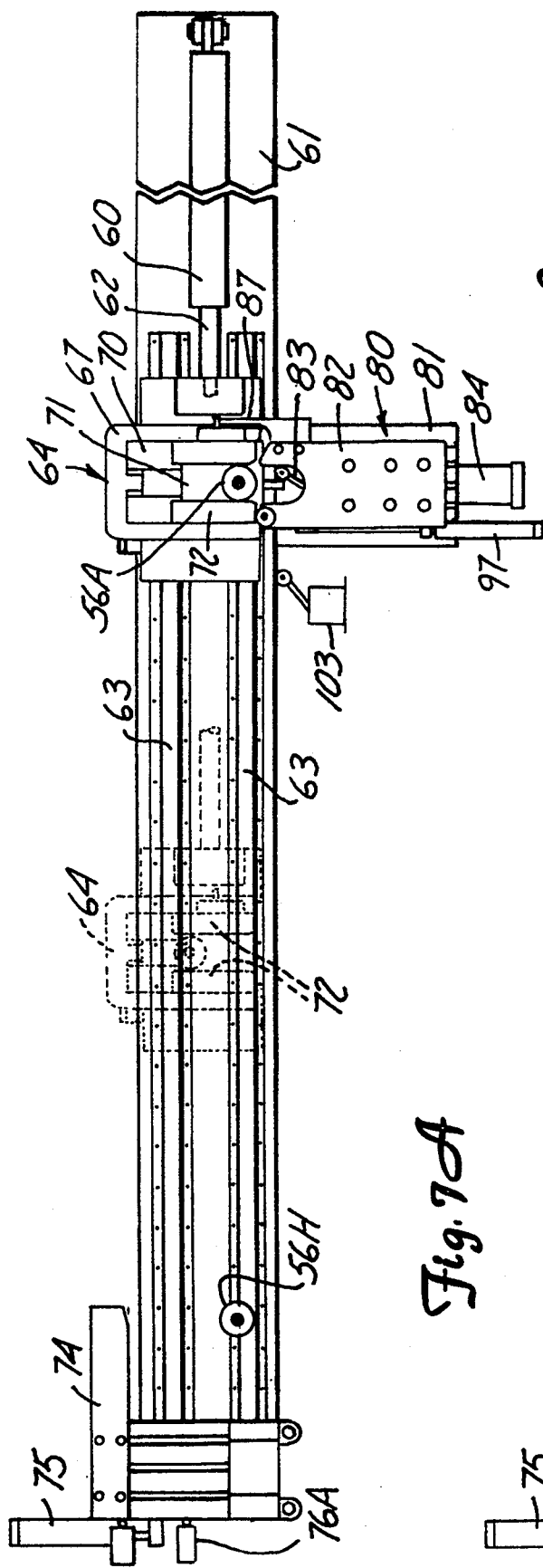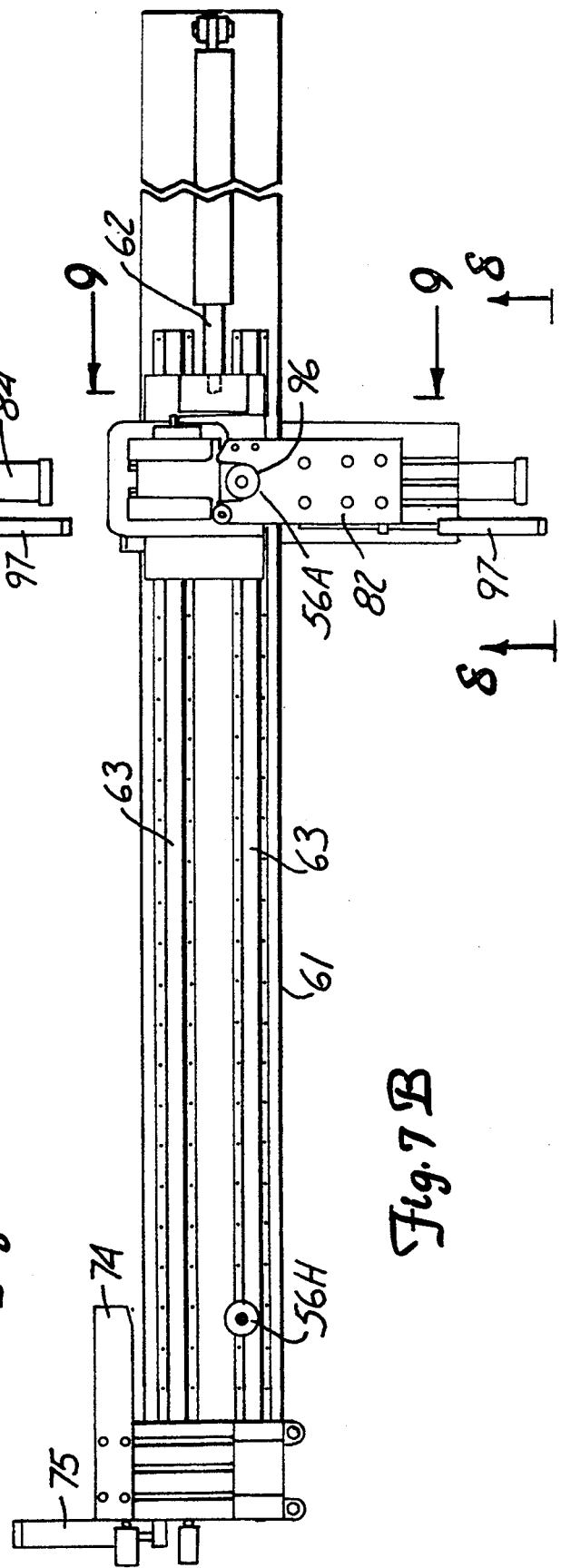

MACHINING CAROUSEL

BACKGROUND OF THE INVENTION

The present invention relates to an apparatus for machining, milling or cutting a plurality of workpieces, using only one operator, where each workpiece is on one of a plurality of independent machining assemblies.

Indexing, rotary plates carrying parts past a plurality of different machining assemblies at stations around the plate are known. The workpieces that are placed on and carried by the rotating plate are indexed, and at each indexed station the work piece has an operation performed so a part is machined completely during a full revolution of the indexing plate.

U.S. Pat. No. 1,732,700 issued Oct. 12, 1925, to Sommer et al describes a series of machining units that are mounted on a rotary turret to travel in an endless path, where each of the machining units moves past the operator's station. As each of the units moves past the operator's station the operator removes the finished workpiece or article and inserts a blank or unfinished workpiece onto a shaft or chuck. The machining of each blank occurs during the rotation of that individual machining unit about the endless path.

In more detail, the Sommer's patent comprises a base with a post attached at the center thereof, where the series of machining units are mounted about the post and suspended downward therefrom. Each workpiece, which is shown as a spindle, is inserted into a tapered socket chuck so that it can be machined. The machining occurs during the rotation of the turret relative to an annular cam track which rises throughout the rotation. The cam controls moving the workpiece into and out of contact with the cutter. At the point where the operator loads and unloads the workpieces, the annular cam track has a depressed portion such that the finished workpiece can be removed from the cutter and a new blank or unfinished workpiece can be inserted. The machining action in the Sommer invention is dependent upon the rotation of the machining device on the annular cam track such that the workpiece will be initially forced into contact with the cutter at a shoulder and movement of the workpiece results from the contour of the annular cam track, which completes the machining action. Thus, the workpiece can not be machined without rotation of the machining tool relative to the annular cam track.

SUMMARY OF THE INVENTION

The present invention provides an apparatus which comprises a plurality of machining assemblies mounted on a carousel each of which is a self contained machining assembly that completes a machined part from a blank during one revolution of the carousel.

The machining carousel of the present invention has a carousel support member which rotates along a peripheral closed path about a central axis. Preferably the carousel is supported on wheels that are attached to a base. A plurality of identical self-contained machining assemblies are mounted to the carousel. Each machining assembly performs machining operations on a separate workpiece independent of the carousel, the support wheels, and the rotational position of the carousel.

In the embodiment illustrated, rotation of the carousel is caused by an actuator which advances the carousel in angular increments. The actuator begins rotation when a signal is received indicating all safety precautions have been met.

The machining centers as shown are NC or CNC machines, each completely independently programmable and each provided with power and operating air from a center commutator which connects to plant supplies.

BRIEF DESCRIPTION OF THE DRAWINGS

FIG. 5A is a detailed top plan view of the actuator assembly where the advancing body is positioned with the actuator fully extended.

FIG. 5B is a detailed plan view of the actuator assembly of FIG. 5A in which the advancing body has been moved to engage a drive cam roller.

FIG. 6 is an enlarged side view of an advancing body taken on line 6—6 in FIG. 5A.

FIG. 7A is a top plan view similar to FIG. 5A with the advancing body retracted, and illustrating a partial retracted position in dotted lines.

FIG. 7B is a view similar to FIG. 7A with the advancing body moved to release the drive roller.

DETAILED DESCRIPTION OF THE PREFERRED EMBODIMENTS

Figure 1:
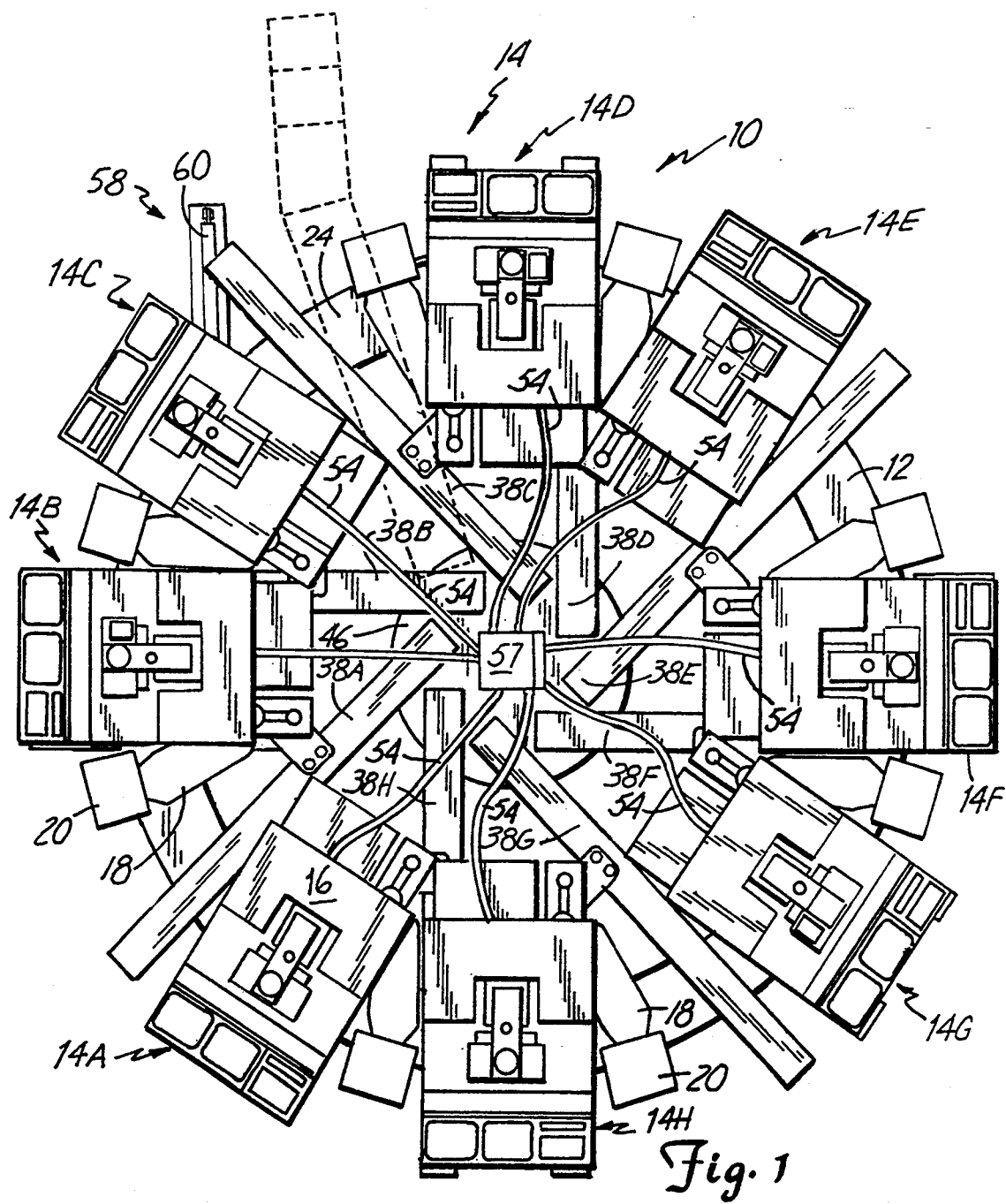
FIG. 1 is a top plan view of the present invention with machining assemblies in place on a carousel.

A preferred embodiment of a machining carousel in accordance with the present invention is illustrated in FIG. 1 generally at 10. The machining carousel 10 includes a rotatable turret or carousel plate 12 having workpiece machining means 14 thereon. The workpiece machining means comprises eight identical computer numerically controlled self-contained machining assemblies,comprising first through eighth computer numerically controlled machines 14A, through 14H, respectively. The identical self-contained machining assemblies 14A-14H each contain an identical machining body 16, metal shaving and fluid coolant exhaust channel 18 and removal container 20 for collecting the metal shavings from each respective machining body 16. As illustrated, each of the machining assemblies 14A-14h is positioned about the perimeter of the carousel plate 12 and face outwardly away from the center of the carousel plate 12 so that an operator standing at an operator's station can remove finished workpieces from the machining assemblies 14A-14H as the machines rotate and stop in front of the operator. After removing the finished workpieces from a particular machining assembly, the operator installs a new blank workpiece to be machined. The carousel 10 then rotates or indexes to position another machining assembly in front of the operator, while the other machining assemblies are carrying out the needed sequence of operations to machine each of the individual workpieces independent of the position of the carousel plate 12 or any external guide members.

The rotatable carousel plate 12 is a circular ring with a hole or aperture in the center on its axis of rotation. The carousel plate 12 has a lower or first face 22 and an upper or second face 24.

Figure 2:
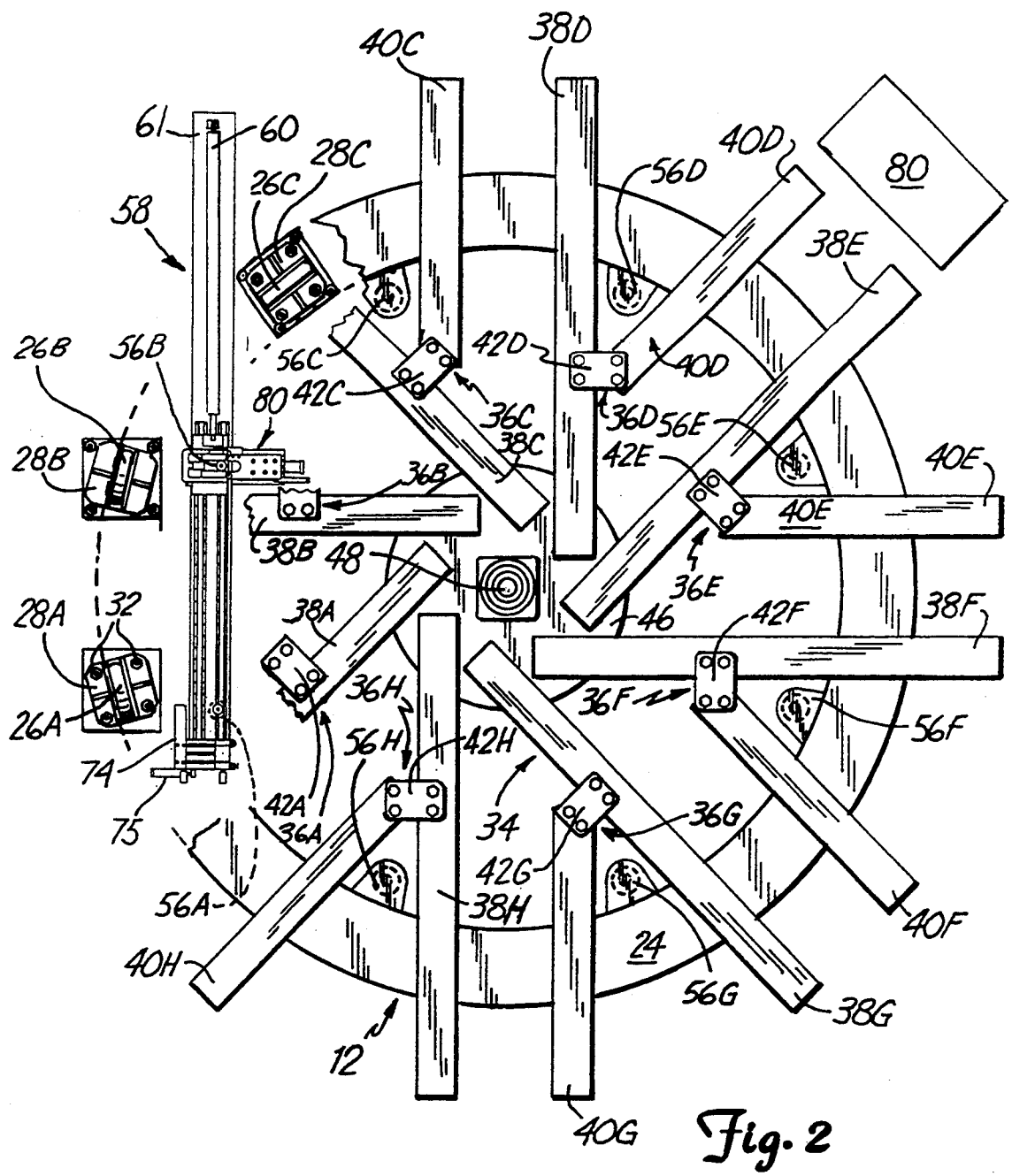
FIG. 2 is a top plan view of the carousel of FIG. 1 with machining assemblies removed and portions of the frame broken away.

A plurality of wheel assemblies, shown in FIG. 2, support the carousel plate 12 for rotation about its axis of rotation and comprise first through twelfth wheels 26A through 26L and supported on first through twelfth wheel frames 28A through 28L, respectively. The plurality of wheel frames 28A-28L are fixedly attached to a base 30 where each wheel 26A-26L is in rotatable contact with the first face 22 of the carousel plate 12. Fasteners 32 connect each of the wheel frames to the base 30.

This plurality of wheels 26A-26L, and wheel frames 28A-28L, and the carousel plate 12 support the plurality of identical self-contained machining assemblies 14A-14H. Each of these identical self-contained machining assemblies 14A-14H is positioned on a support assembly 34. The support assembly 34 is welded to the second face 24 of the carousel plate 12 and consists of eight pairs of supports, more particularly, first through eighth pairs of supports 36A through 36H. The supports 36A through 36H each comprises a first long support section 38A through 38H, respectively, and a first short support section 40A through 40 H, respectively. Each machining assembly 14A-14H is situated on the corresponding pair of supports 36A-36H. The long support sections 38A-38H and short support sections 40A-40H in each pair of supports 36A-36H are parallel to one another and substantially perpendicular to the carousel plate 12 at the points the support assembly 34 is welded to the carousel plate 12.

Each of the support pairs 36A-36H are joined to each adjacent support pair. As illustrated, the support pair 36A is joined with a plate 42A to support pair 36B. Similarly, plates 42B through 42H are used to join the support pairs 36B through 36H to the next respective support pair.

Figure 3:
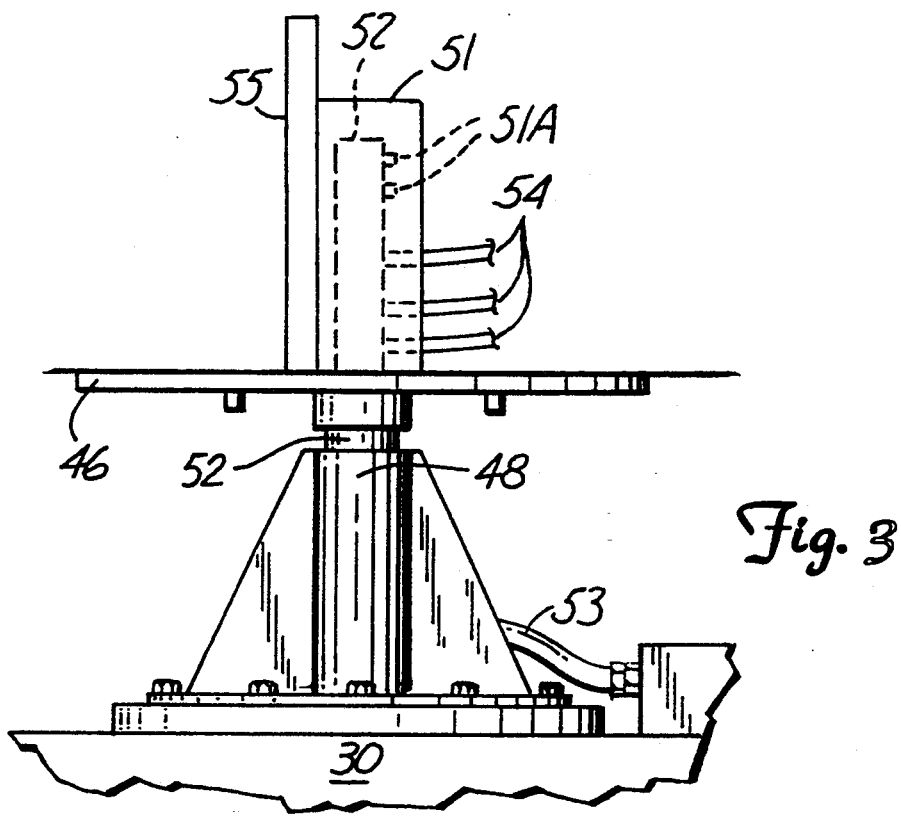
FIG. 3 is a detailed view of a center support post for the carousel of FIG. 1.

The support assembly 34 further consists of a center circular plate 46 upon which each of the long support sections 38A-38H is attached. The center circular plate 46 as shown in FIG. 3 is attached through bearings (not shown) to a center post 48 which is fastened to the base 30.

Figure 4:
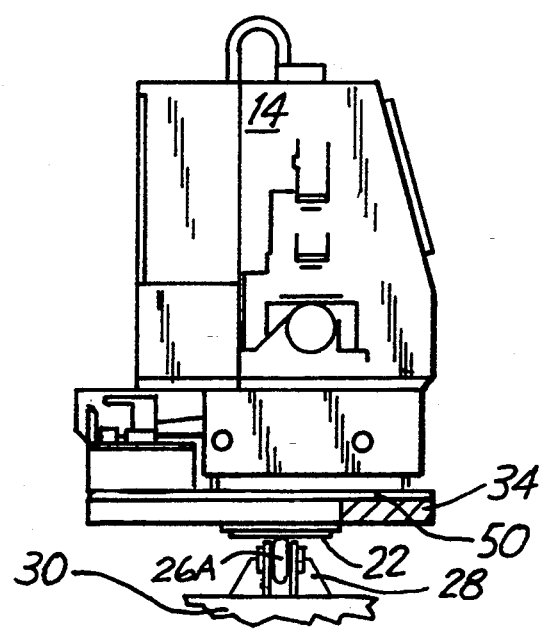
FIG. 4 is a side elevational view of one of the machining assemblies above a support wheel for the carousel of FIG. 1.

A layer of vibration damping material 50 supports each machining assembly 14A-14H on the support assembly 34 as shown in FIG. 4. This damping material reduces vibrations transferred from the carousel plate 12 to the machining assemblies 14A-14H during movement of the machining carousel 10. In particular, the damping material reduces the jarring effects as the machining carousel 10 is stopped and restarted with incremental indexing movement of the machining assemblies past the operator. Since typical prior installation of the machining assemblies is stationary upon a floor, damping material was unnecessary. However, in the present invention, sudden movement of the machined part may affect its quality.

The machining assemblies 14A-14H can be any type of machining, milling or cutting apparatus which takes an unfinished workpiece blank and either finishes the workpiece or completes a step necessary in finishing the workpiece. Each of these machining assemblies 14A-14H is self contained such that if the machining assembly was separate from the other machining assemblies and the carousel plate 12, the machining assembly could independently and automatically machine a workpiece. The carousel plate 12 provides means for continuously moving a plurality of the machining assemblies along a path such that an operator can unload finished workpieces and then load unfinished workpieces into one of the self contained machining assemblies at a single operator's station. A single operator sequentially unloads and loads a plurality of machining assemblies 14A-14H such that when the first machining assembly 14A returns to the operator station after traversing the path, all of the other machining assemblies 14B-14H will have been unloaded and loaded and the machining process for the workpiece on the first machining assembly 14A is complete.

The machining assemblies 14A-14H can be powered either by an internal source, such as a battery, or as in this embodiment, by an external source where the tubing 54, which includes pressurized air connections and wiring, extends from the rear of each of the machining assemblies 14A-14H to the centrally located power center 51. The power center 51 is mounted to the circular plate 46 of the carousel plate 12 for rotation therewith. The center circular plate 46 is mounted to a centerpost 48 that in turn is mounted to the base 30 at the center of the carousel plate 12. Suitable electrical slip rings and air pressure commutators 51A transfer power and air pressure to the rotating power center 51 from source lines 53 connected to a center fixed, post 52. The power center 51 includes a circuit breaker panel 55 with circuit breakers, not shown, for each machining assembly 14A-14H.

Referring back to FIG. 2, a plurality of cam rollers 56A, 56B, 56C, 56D, 56E, 56F, 56G, and 56H are connected to the first face 22 (FIG. 4) of the carousel plate 12 in a manner such that they are rotatable. The number of cam rollers 56A-56H is equivalent to the number of machining assemblies 14A-4H in front of the stationary operator.

As stated above, the carousel plate 12 is advanced in increments or ranges of degrees that are equivalent to the distance between each machining assembly. During each increment, the carousel plate 12 rolls on the plurality of wheels 26A-26H at different angular velocities or rotational speeds, which will be discussed in more detail later.

The carousel plate 12 is incrementally advanced or indexed by an actuation or indexing assembly 58 which pulls the carousel plate 12 a circumferential distance of 1/n of the total distance of the closed peripheral path, where n is equal to the number of machining assemblies, in this embodiment eight. The actuation assembly 58 mounted between the fixed base 30 and the carousel plate 12, as shown comprises a cylinder 60 fixed to the base 30 with a piston rod 62 extendable and retractable relative to the cylinder base. An advancing body 64 attaches to the piston rod 62.

The actuation assembly 58 further includes an elongated frame 61 that supports a pair of guide rods 63 that are elongated and extend in direction outwardly from the rod end of cylinder 60. The guide rods 63 are generally parallel to and on opposite sides of the piston rod 62. The piston rod travels between the guide rods 63.

The advancing body 64 is slidably mounted on the guide rods 63 as shown with a set of linear bearings 66 that are in turn attached to the bottom of a support plate 67 that is connected to the rod 62 (see FIG. 6). The advancing body further includes a slide base 70 that in turn slidably mounts a dove-tail cross slide 71 for movement transverse to the axis of the piston rod 62. The cross slide 71 is provided with a pair of carousel drive blocks 72, 72 which are spaced apart a distance substantially equal to the diameter of the rollers 56A through 56H. Since FIG. 6 illustrates the advancing body 64 with the piston rod fully extended, the roller 56A is designated in that view.

The carousel drive blocks 72, 72 have beveled ends for ease of receiving a roller 56A–56H therebetween, and travel with the cross slide 71 laterally of the axis of the piston rod 62.

The start of a cycle for indexing is essentially as shown in FIG. 5A. There, the slide block 71 is shown in a retracted or disengaged position in which the carousel drive blocks 72 clear the roller with 56A as the advancing body slides along the guide rods 63, with the carousel in an indexed position as shown in FIG. 5A. The positioning of the cross slide 71 is controlled by external cross-slide actuation adjacent the advancing body 64 when the body is at respective opposite ends of the stroke of the piston rod 62 of cylinder 60. The roller 56B in FIGS. 5A and 5B will be held, as will be explained, when the piston rod 62 is advancing by a disengagement slide plate, adjacent the cylinder 60.

When the piston rod reaches the end of its extended stroke, a signal will be generated by a limit switch shown at 73 that will activate a mechanism to release roller 56B and will in turn energize an actuator 75 which is mounted to a roller engagement slide bed 76, and the rod of actuator 75 is connected to move and slide laterally a drive roller engagement arm 74. The roller drive engagement arm 74 is a bar that engages one of the cross slide drive block 72 on the advancing body when the actuator 75 is extended. The cross slide 71 will be moved to a drive roller engaging position as shown in FIG. 5B. In this position, the roller 56A is trapped between the blocks 72, and the piston rod for the actuator 75 has been extended to a position where a limit switch 76A provides a signal that the drive roller 56A is engaged by the advancing body cross slide and drive block 72, and this signal in turn then will actuate the cylinder 60 so that the rod 62 retracts.

The roller 56B will have been released before the cylinder 60 will retract. As can be seen in FIG. 6, the drive block 72 move to trap the roller 56A between them for movement in direction as indicated by the arrow 78 (FIG. 6).

Figure 8:
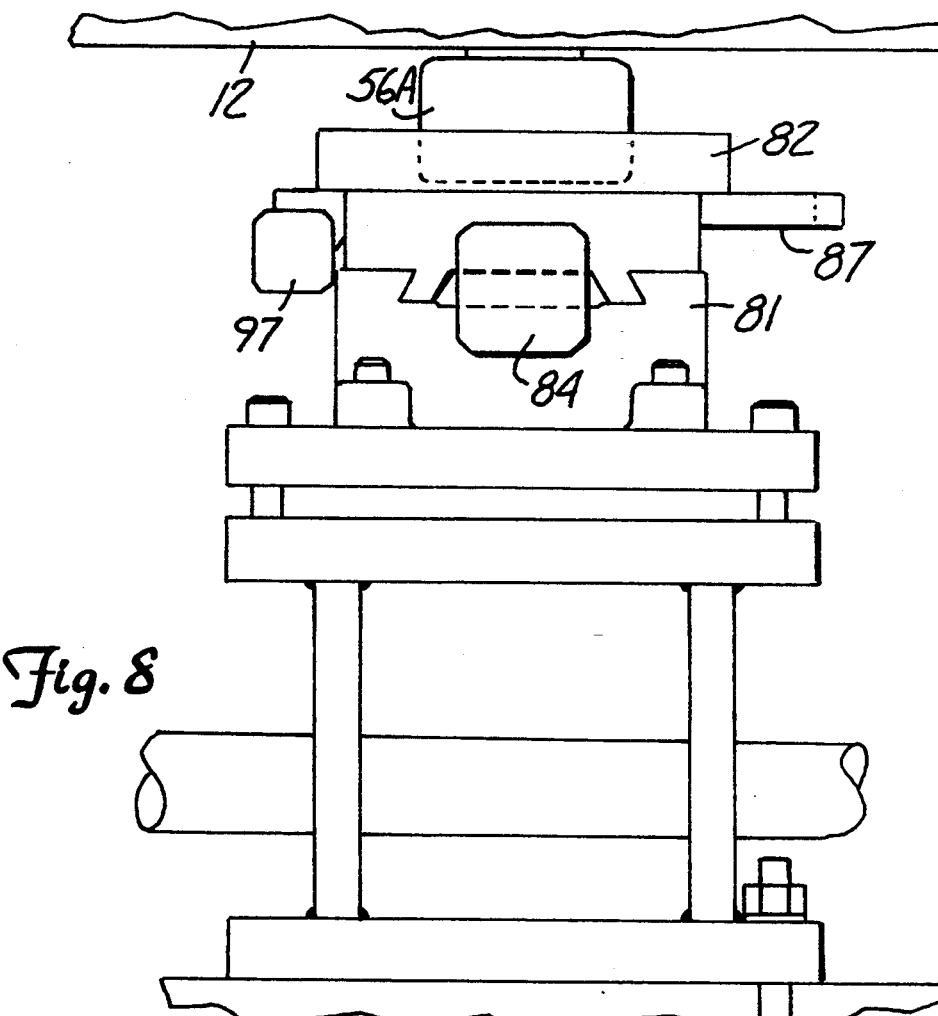
FIG. 8 is a fragmentary side view of a release slide taken on line 8—8 of FIG. 7A.
Figure 9:
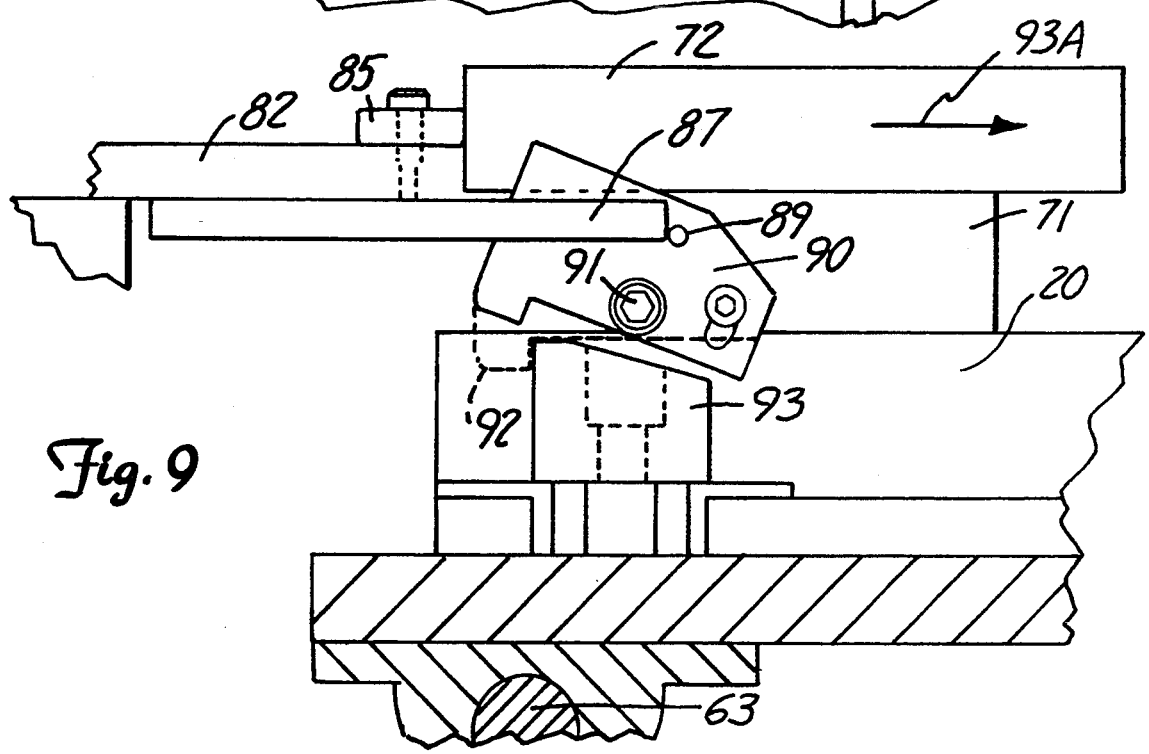
FIG. 9 is a view showing a latch for a cross slide taken on line 9—9 in FIG. 7B.

The cross slide 71 is locked in this drive position using a latch, as also will be further explained in reference to FIGS. 8 and 9.

The speed of the hydraulic cylinder 60, that is the lineal speed of the piston rod 62, will be changed in the cycle, to provide for a slow acceleration, a general movement speed for rotating the carousel, and then a gradual deceleration prior to stopping.

FIG. 7A illustrates the advancing body 64 in dotted lines in a mid-position of movement during indexing, and it can be seen that the roller 56A moves on an arc because it rotates about the center axis of the carousel. The roller 56A will move between the drive blocks 72 sufficiently to accommodate this arcuate movement.

FIG. 7A shows the carousel advancing position of roller 56A when the cylinder 60 has been fully retracted. In this position, assuming now that the advancing body 64 has been stopped with the rod 62 in the fully retracted position, the advancing body 64 is over a second roller disengagement actuating assembly 80 which includes a slide bed 81, that mounts a disengagement slide plate 82 for movement laterally of the axis of the piston rod 62. It can be noted that this slide plate 82 is on the opposite side of the advancing body 64 from the roller engagement assembly at the extended position, including the slide bed 73 and actuating arm 74.

A suitable limit switch shown schematically at 83 will provide a signal that the cylinder 60 is fully retracted, and that the carousel therefore has been incremented one station. At that time, a disengagement cross slide actuator 84 will be operated, and it will move the slide plate 82 laterally of the advancing body 64, and laterally of the axis of the piston rod 62. A roller 85 will engage an end of one of the roller drive blocks 72 and as the actuator 84 extends, this roller 85 will push the drive blocks 72 and the slide 71 laterally in a direction that will cause the drive block 72 to become disengaged from the carousel drive roller 56A.

In FIG. 8, an end view of the disengagement cross slide is shown, including the base 81, and the slide plate 82. A latch release finger 87 is connected to the slide plate 82 on one side thereof, and it extends toward the piston rod 62. Prior to the time that the roller 85 engages the drive lug 72, the end of the release finger 87, as shown in FIG. 9, will engage a lateral release pin 89 that is attached to a pivoting latch 90. The pivoting latch 90 is mounted on a pivot bolt 91 that is attached to the slide member 71 on one side thereof, and the latch member 90 has an end latch dog 92, which when the cylinder is being retracted, will fit over a latch lug 93, and will keep the cross slide 71 from moving laterally in direction as indicated by the arrow 93A in FIG. 9.

The latch release finger 87 is of sufficient length to engage the release pin 89 prior to the time that the roller 85 engages the appropriate drive block 72, so that the latch dog 92 is released to its solid line position as shown in FIG. 9 before the cross slide 71 is moved laterally. The extension of the cylinder 84 will move the slide plate 82 to a position wherein the drive block 72 and the cross slide 71 had been moved so that the drive block will clear the roller 56A in a plane extending parallel to the axis of the piston rod 62. At the same time, however, a roller retained in receptacle 96 formed on disengagement slide plate 82 will move around the roller 56A, which was just incremented by operation of the cylinder 60. It is to be kept in mind that the roller 56A is attached to the carousel plate 12, while the advancing body is mounted on the rails 63 independently of the carousel plate 12.

The disengagement slide plate 82 will then hold the roller 56A from movement about the axis of the carousel, and thus will hold the carousel stationary as long as the slide plate 82 is in its position as shown in FIG. 7B. An LVDT 97 is mounted to determine the position of the slide plate 82 and provide a signal that indicates that the slide plate 82 is securely holding the first indexed roller 56A before any further operation of the cylinder 60 is permitted to occur. Once that signal is given, however, and the slide plate 82 is holding the roller 56A (or one of the other rollers 56) securely, then the controls will provide a signal to cause the piston rod 62 to extend and the advancing body will move along the rails 63 back to the position as shown in FIG. 5A.

Referring again to FIG. 5A, as the advancing body moves toward the extended position of the piston rod 62 a lug on the advancing body will engage a limit switch or position indicating switch 100, and at this time, the controls will cause the speed of the cylinder 60 to be reduced, so that the piston rod slows down. When the lug on the advancing body hits the limit switch 73 it will be stopped, and a signal will be given that the unit is in fact in its home position. The operation of the pneumatic cylinder 75 will cause the roller drive engagement arm 74 to be moved and engage the drive block 72 to move the cross slide 71 laterally to engage the next roller 56 in position. The movement of the cross slide causes the latch dog to slide up the ramp on lug 93 and pivot to a latched position to hold the drive blocks positively in position. It should be remembered that the roller that is adjacent the retracted position of the advancing body, (as shown in FIG. 5A roller 56B) is being securely held by the slide plate 82, which is in its dotted-line position shown in FIGS. 5A and 5B. When a signal has been given that the arm 74 has moved the drive block 72 to the position shown in FIG. 5B engaging the roller 56 that is aligned (as shown in FIG. 5B, roller 56A) the switch 76A will give a signal that will permit the actuator 84 to retract the slide plate 82 and release the latch roller 56 that is held in the receptacle of the slide plate. This is to ensure that there is precise alignment between the drive block 72 and the roller that will be engaged for indexing before the actuator 75 is operated. The holding action by plate 82 insures that the carousel doesn't rotate slightly and cause misalignment during the time that the piston rod 62 is being advanced.

Once the slide plate 82 has been released, the cylinder 60 will be operated and will start at a slow speed, until the lug on the advancing body passes the limit switch 100. Then the retraction speed of the rod 62 will be increased, until the lug on the advancing body engages a limit switch 103 at which time there will be a deceleration or slowing down of the advancing body and the piston rod 62 until the advancing body reaches its home position and engages the limit switch 83, the advancing body will then be stopped, and the disengagement slide plate 82 will move slide 71 laterally so that the drive blocks 72 release the roller that they had just been engaging for advancing the carousel, and that roller will enter into the receptacle 96 used for retaining the roller in the slide plate 82. The cylinder 60 can be extended again and will be extended at an initial slower speed, and then accelerated when it hits the limit switch 103, and run at a higher rate of speed until the advancing body engages limit switch 100 and slows down again. This avoids shock loads and jarring of the units. The velocity profile can be obtained by a number of different control signal inputs, and limit switches and LVDT's are only exemplary.

The carousel plate 12 rotates at two different speeds, although a single or three or more speeds is contemplated by the applicant. The switches are positioned along the path the advancing body 64 to control the time and location of acceleration and deceleration as well as the normal speed of travel.

The advantages of a multiple speed carousel plate 12 are the avoidance of a large jerk at the initial moment of acceleration and at the ceasing of all velocity since incremental acceleration and deceleration of the hydraulic cylinder 60 will involve significantly smaller jerk, which is advantageous because of the high reliability and small tolerances needed in the machining operations occurring when the carousel plate is being moved.

Figure 10:
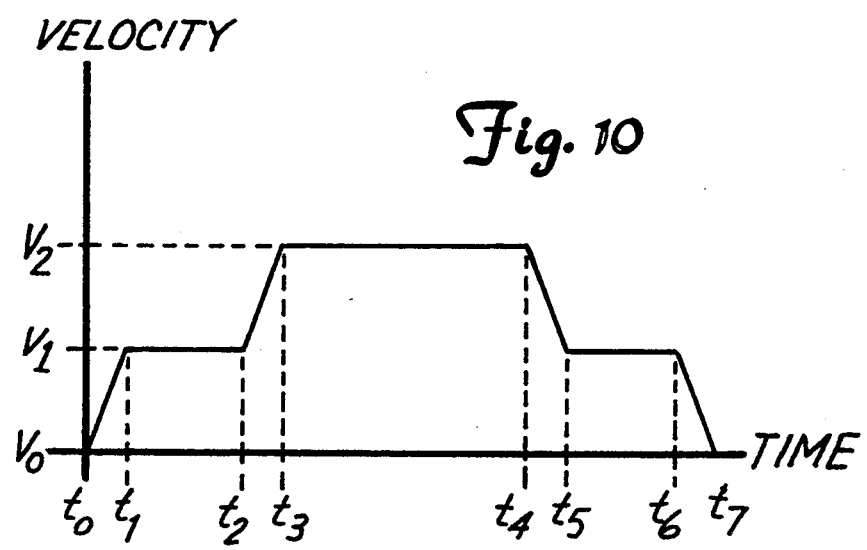
FIG. 10 is a graph illustrating the velocity of the machining carousel during on incremental advancement.

FIG. 10 shows a velocity vs. time graph where the initial acceleration is controlled by the oil flow caused by a signal from either the limit switch 76A of LVDT 97. This initial acceleration occurs from time $t_0$ to time $t_1$, and results in an initial speed $v_1$. Additional acceleration is caused by tripping of switch 100 from time $t_2$ to time $t_3$ and results in intermediate speed of $v_2$ during the major part of the travel. Deceleration is caused by a switch 103 from time $t_4$ to time $t_5$ resulting in a return to speed $v_1$. Finally, the actuator assembly is decelerated to a stop by the switch 83 from time $t_6$ to time $t_7$. The velocity profile can be modified if desired.

A safety mat 80 is positioned outside of the carousel plate 12 where the operator is loading and unloading the machining assemblies. The safety mat 80 is connected in a circuit with a switch or relay that operates the valve that activates the hydraulic cylinder 60. The relay will not operate to activate the cylinder after is has stopped until the operator steps onto the safety mat 80 and then moves off the safety mat 80. Without this sequence the hydraulic cylinder 60 will not extend.

The safety mat 80 requires a sequence of events as follows for the carousel plate to be rotatable:

Step 200: The operator steps onto the safety mat and the sensors in the mat close under the weight of the operator, the carousel is then disabled, as the cylinder 60 cannot be operated.

Step 201: The operator unloads a completed workpiece from the machining assembly.

Step 202: The operator loads an uncompleted workpiece or block onto the machining assembly.

Step 203: The operator steps off of the safety mat such that the sensors indicate the removal of the weight of the operator.

Step 204: The operator activates the switch for the valve for cylinder 60, by placing his finger in an indication pad. The indication pad is also part of the safety circuit including the sensor in the safety mat. If after the cylinder 60 has stopped and prior to again pushing the indication pad, the operator steps onto and off the mat, then a signal will be sent by the indication pad to the hydraulic cylinder controls to initialize those controls. However, if the sequence was not followed, no signal will be sent.

Step 205: The cam roller (56A–56D) which was moved during the immediately previous retraction of the piston rod for moving the carousel plate is held by slide plate 82, as explained and slide 71 is disengaged from that roller.

Step 206: The piston rod on the hydraulic cylinder is extended out from the hydraulic cylinder.

Step 207: The advancing body searches the extended position and with slide plate still holding the roller 56 last moved, cylinder 75 is operated to move slide 71 and drive blocks 72 to engage the next roller 56.

Step 208: A switch indicates the drive blocks 72 are in position and slide plate 82 releases the previous driver roller 56.

Step 209: The piston rod is retracted into the hydraulic cylinder causing rotation of the carousel plate. During this actuation, the cam roller 56 being driver rolls outwardly between drive blocks 72 and then inwardly to accommodate the arc of movement of the roller. During the step 209 the following substeps occur.

Step 209A: A first switch activates the retraction of the piston rod.

Step 209B: The retraction of the piston rod accelerates to an initial speed.

Step 209C: A second switch initiates an acceleration to increase velocity.

Step 209D: The retraction of the piston rod accelerates to an intermediate speed.

Step 209E: A third speed switch is activated causing deceleration of the piston rod.

Step 209F: The piston rod decelerates to a final speed.

Step 209G: A switch stops the piston rod in retracted position.

At this point, one full incremental actuation of indexing of the machining carousel has occurred.

The safety mat 80 also serves as a safety speed reducer if stepped on during extension or retraction of the hydraulic cylinder 60. The velocity of the hydraulic cylinder is reduced to a velocity substantially equal to that of the initial speed, if the safety mat 80 is stepped on during extension or retraction.

In an alternative embodiment, two operators are positioned to load and unload workpieces from adjacent machining assemblies. This allows workpieces that take production time equivalent to half or less of the rotation time needed including loading and unloading to be positioned on the machining carousel. The only alteration to the carousel plate is that the number of cam rollers is reduced in half to allow the increments of indexing to move through an angle section occupied by two machining assemblies. That embodiment involves two safety mats and either one or two switch mechanisms.

While the particular construction shown for advancing the carousel in increments or steps exemplifies a method of indexing, the use of a direct friction roller driving against a drive plate on the carousel is envisioned, which would be controllable as to motor speed, so that acceleration and deceleration could be precisely controlled, and also motor braking. The friction roller is believed to be less complicated, and to have adequate drive capabilities. The friction roller would mount underneath the carousel, and would be controlled by a drive motor at a desired, relatively low speed. A positive gear drive also could be used.

The drive can be effected with closed loop controlled servomotors, hydraulic motors or other controllable drive elements.

Although the present invention has been described with reference to preferred embodiments, workers skilled in the art will recognize that changes may be made in form and detail without departing from the spirit and scope of the invention.

What is claimed is:

1. A machining apparatus for machining workpieces, the machining apparatus comprising:
   a fixed base;
   a carousel having a center axis;
   support means for supporting the carousel on the fixed base and supporting the carousel at positions spaced outwardly from the central axis while allowing rotation of the carousel about the center axis;
   drive means for rotating the carousel about the center axis;
   a plurality of identical self-contained machining assemblies mounted to the carousel at spaced apart positions about a perimeter thereof, wherein each machining assembly performs machining operations independent of a rotational position of the carousel relative to the base during rotation of the carousel and independent of other machining assemblies; and
   means for supplying power to each of the plurality of the identical self-contained machining assemblies.

2. The apparatus as specified in claim 1 and further compromising fastening means for fastening each of the plurality of self-contained machining assemblies to the carousel, the fastening means including damping means for damping vibrations between the self-contained machining assemblies and the carousel.

3. The apparatus as specified in claim 1 wherein the support means comprises a plurality of rotating wheels providing support between the fixed base and the carousel.

4. The apparatus as specified in claim 1 wherein the carousel has a first surface facing the fixed base and a second surface opposite the first surface, the plurality of self-contained machining assemblies being mounted on the second surface and the rotating means being located between the fixed base and the carousel, the rotating means engaging the first surface.

5. The apparatus as specified in claim 1 and further comprising means for selectively prohibiting rotation of the carousel.

6. The apparatus as specified in claim 1 wherein the rotating means rotates the carousel incrementally, and wherein one rotation of the carousel comprises a plurality of equally spaced carousel stops.

7. The apparatus as specified in claim 6 wherein the rotating means rotates the carousel between each of the plurality of equally spaced carousel stops at at least two different angular velocities.

8. The apparatus as specified in claim 7 wherein the rotating means rotates the carousel between each of the plurality of equally spaced stops at a first angular velocity for a first range of selected degrees; a second angular velocity for a second range of selected degrees, the second angular velocity being greater than the first angular velocity; and a third angular velocity for a third range of selected degree, the third angular velocity being less than the second angular velocity.

9. The apparatus as specified in claim 8 wherein the first angular velocity equals the second angular velocity.

10. The apparatus as specified in claim 8 and detection means connected to the rotating means for detecting presence of an operator at a selected position near the carousel and reducing the angular velocity of the carousel when the operator is present at the selected position.

11. The machining apparatus of claim 1 wherein the plurality of identical self-contained machining assemblies are fixed to the carousel and remain at substantially the same vertical position relative to the carousel throughout the rotation of the carousel about the center axis.

12. The machining apparatus of claim 1 wherein said carousel comprises a plate having an upper face, the machining assemblies being fixed to the upper face and supported thereby for rotation as they perform the machining operation, the connections between the machining assemblies and the fixed base being only adjacent the center of the carousel plate.

13. The machining apparatus of claim 1 wherein the carousel rotates about a central fixed post, and commutator means for carrying power to each of the machining assemblies, said commutator means having one part mounted on the fixed post, and a second part rotating with the carousel and the machining assemblies.

14. The machining apparatus for machining workpieces, the apparatus comprising:
   a fixed base;

a carousel having a center axis;

a plurality of wheels supporting the carousel on the fixed base and allowing rotation of the carousel about the center axis;

rotating means for rotating the carousel about the center axis wherein the rotating means rotates the carousel incrementally, and wherein one rotation of the carousel comprise a plurality of equally spaced carousel stops;

a plurality of identical self-contained machining assemblies mounted to the carousel at spaced apart positions about a perimeter thereof, wherein each machining assembly performs machining operations independent of the support means during rotation of the carousel;

fastening means for fastening each of the plurality of self-contained machining assemblies to the carousel; and means for supplying power to each of the plurality of identical self-contained machining assemblies.

15. The apparatus as specified in claim 14 wherein the carousel has a first surface facing the fixed base and a second surface opposite the first surface, the plurality of self-contained machining assemblies being mounted on the second surface and the rotating means being located between the fixed base and the carousel, the rotating means engaging the first surface.

16. The apparatus as specified in claim 1 wherein the plurality of wheels are secured to the fixed base.

17. A method for machining workpieces comprising:
providing a plurality of identical self-contained independently powered and controlled machining assemblies mounted to a carousel at spaced apart positions about a perimeter thereof, wherein each machining assembly performs machining operations independently of a rotational position of the carousel during rotation of the carousel;

rotating the carousel past an operator positioned at a selected location, wherein one rotation comprises a plurality of equally spaced carousel stops at the operator location;

loading a separate part onto each machining assembly; and providing each machining assembly with power to completely machine a part during the one rotation of the carousel.

18. The method as specified in claim 17 wherein the step of rotating comprises rotating the carousel between each of the plurality of equally spaced carousel stops at at least two different angular velocities.

19. The method as specified in claim 18 wherein the step of rotating comprises rotating the carousel between each of the plurality of equally spaced stops at a first angular velocity for a first range of selected degrees; a second angular velocity for a second range of selected degrees, the second angular velocity being greater than the first angular velocity; and a third angular velocity for a third range of selected degree, the third angular velocity being less than the second angular velocity.

20. The method as specified in claim 19 wherein the first angular velocity equals the second angular velocity.

* * * * *

UNITED STATES PATENT AND TRADEMARK OFFICE
CERTIFICATE OF CORRECTION

PATENT NO. : 5,421,072
DATED : June 6, 1995
INVENTOR(S) : William G. Kuban

It is certified that error appears in the above-indentified patent and that said Letters Patent is hereby corrected as shown below:

Column 10, line 2, cancel "compromising" and insert --comprising--.

Signed and Sealed this

Twenty-seventh Day of February, 1996

Attest:

BRUCE LEHMAN

*Attesting Officer*     *Commissioner of Patents and Trademarks*